United States Patent [19]

Korostoff et al.

[11] 3,917,217

[45] Nov. 4, 1975

[54] RESILIENT CORE APPARATUS FOR FABRICATION OF EXTRUSION DIES

[75] Inventors: Edward Korostoff; Gary K. Zin, both of Philadelphia, Pa.

[73] Assignee: Matcon, Inc., Philadelphia, Pa.

[22] Filed: Oct. 1, 1973

[21] Appl. No.: 402,296

Related U.S. Application Data

[60] Continuation of Ser. No. 118,872, Feb. 25, 1971, abandoned, which is a division of Ser. No. 18,499, March 11, 1970, Pat. No. 3,588,987.

[52] U.S. Cl............................. 249/183; 425/DIG. 44
[51] Int. Cl.²............................................ B29C 1/12
[58] Field of Search..... 425/DIG. 44, 392; 249/114, 249/117, 127, 139, 183

[56] References Cited
UNITED STATES PATENTS

| | | |
|---|---|---|
| 553,877 | 2/1896 | Stowe.................................. 425/392 |
| 3,034,191 | 5/1962 | Schaeffer et al.............. 425/DIG. 44 |
| 3,166,792 | 1/1965 | Goldfarb...................... 425/DIG. 44 |
| 3,182,355 | 5/1965 | Aranaudin....................... 425/392 X |

Primary Examiner—R. Spencer Annear
Attorney, Agent, or Firm—Gary A. Walpert

[57] ABSTRACT

An extrusion die is made by stretching a flexible membrane having one end held in a shape conforming to the input end of the die and the other end maintained in conformity with the desired profile of the part to be extruded.

A fluid having hardening properties is applied to one surface of the distended membrane. Once the material has hardened, the flexible diaphragm is stripped away, and the resultant contour is coated with a material to form the contour of the die. This contour is cast in a shell, with appropriate heat and heat sensing elements, to form the die.

6 Claims, 16 Drawing Figures

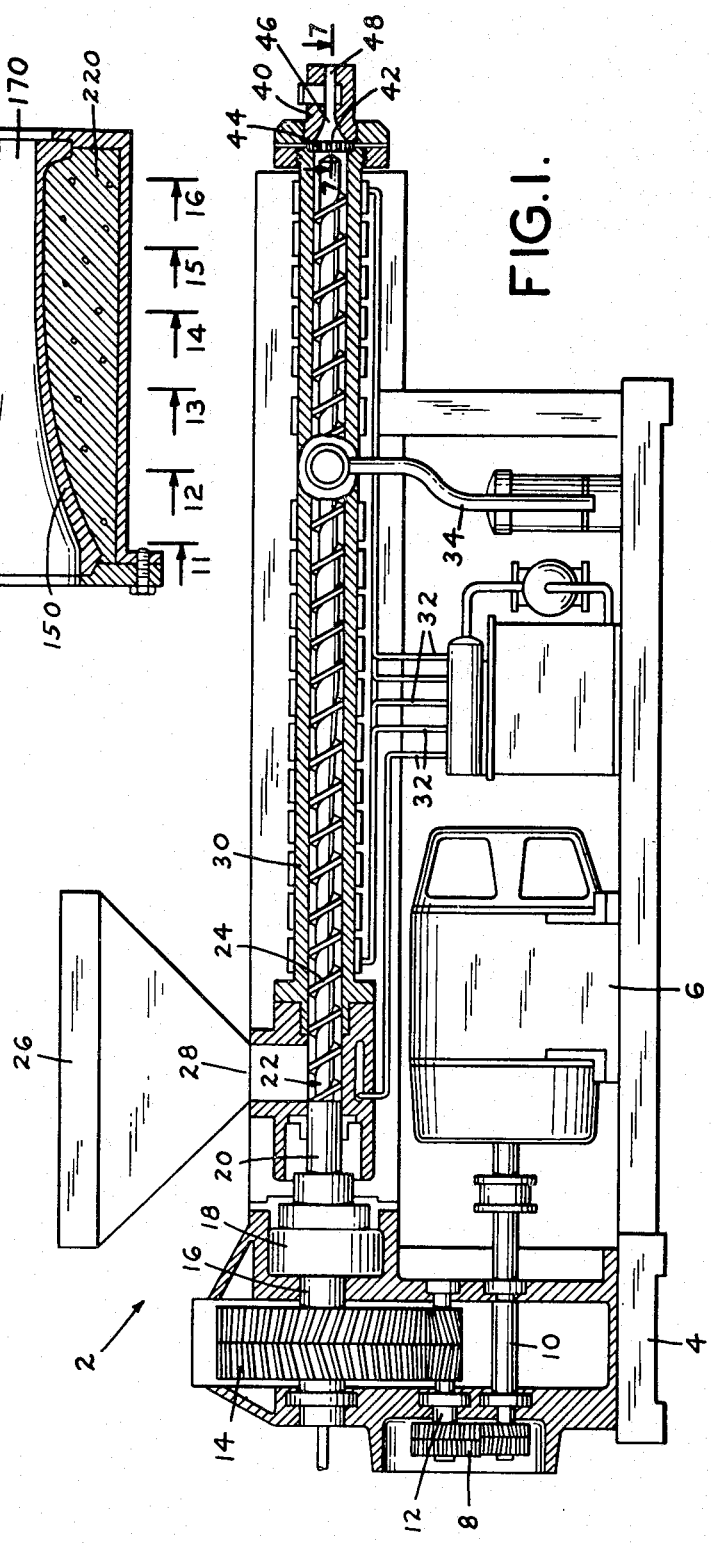
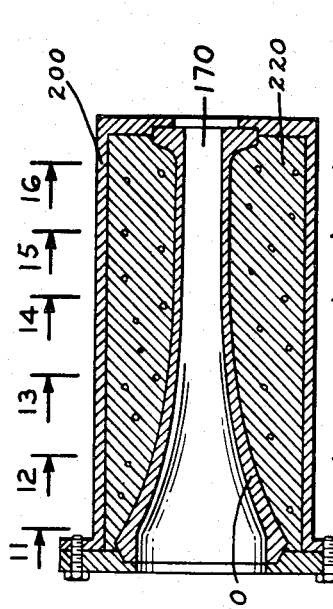
FIG. 1.
FIG. 10.

EXPONENTIAL CONTOUR FOR LINER

RESILIENT CORE APPARATUS FOR FABRICATION OF EXTRUSION DIES

This is a continuation of application Ser. No. 118,872, filed Feb. 25, 1971, now abandoned. Application Ser. No. 118,872 which is a division of application Ser. No. 018,499, filed Mar. 11, 1970, now U.S. Pat. No. 3,588,987, issued June 29, 1971.

BACKGROUND OF THE INVENTION

This invention relates to the fabrication of extrusion dies and particularly to the fabrication of dies having an input port-to-output port contour substantially similar to the idealized flow patterns of the material to be extruded. The shape of extruded material is dependent primarily on the configuration of the dies through which the material is forced. Such dies are often referred to as profile dies. The profile dies are affixed to the exit port of an extrusion apparatus. The exit port of the extrusion apparatus is usually of a circular configuration. The dies must transform a substantially cylindrical melt of viscous material into a length of hardened material having an outer peripheral contour or profile of the desired configuration. An idealized profile die configuration would be one which would permit a gradual transition from the input port of the die to output port of the die. Both the cross sectional area and the shape change should vary uniformly as the material to be extruded progresses from the exit port of the extrusion apparatus to the final profile of the product.

The more complicated the shape of the finally extruded product, the greater is the difficulty in achieving a gradual transition between the input port of the profile die and the exit port of the profile die. The present profile dies are hand tooled and attempt to achieve a gradual transition over a short axial distance. Initially such profile dies had little or no transition region over which the material to be extruded, usually referred to as the extrudate, could be transformed from a circular melt to a configuration having the desired contour or profile. A block of material, preferably steel, having an orifice the shape and size of the extruded product was affixed to the exit end of the extrusion apparatus. This resulted in block part of the extrudate. This back-up or blocking of extrudate often resulted in melt fractures and burning part of the extrudate. To overcome this deficiency, the dies and the extrusion apparatus were commonly kept at very high temperatures to allow the extrudate to remain highly fluid. However, this gave rise to post-extrusion problems. The extrudate would exit from the extrusion die and be too warm to maintain the final configuration without undue distortion.

The next designs provided a cone-like transition region prior to the area in the die having the configuration of the finally extruded product. This "hog out" technique lessened the burning of extrudate and the blocking of melt prior to entering the contour area. However, such transition regions were still generally unsatisfactory for mass production applications.

A further problem was that the profile dies themselves had to be kept at a temperature sufficient to allow the material to be extruded to flow through them. However, when dies are machined from a block of steel, as is the normal method for manufacturing extrusion dies, the thermocouples which are used to check the temperature and the heater coils which are used to heat the die generally are displaced a considerable distance from the area in which the extrudate transformation is occurring. Thermocouples may be placed close to the inner surface of the die. Immersion heaters may also improve the position of application of heat. However, heating the massive steel die is one of the primary reasons for thermal lag. A considerable period of time may elapse between the sensing of a defiency in the temperature of the die and rectifying the temperature problem. Because of the stresses and temperature of the die operation, it is not generally feasible to employ materials in manufacturing profile dies which will result in a lesser thermal lag.

BRIEF DESCRIPTION OF ONE EMBODIMENT OF THE INVENTION

This invention permits the manufacture of a novel design for extrusion dies. Dies manufactured as contemplated in the invention provide a gradual reduction from the exit port of the extrusion apparatus to the exit port of the profile die which is similar to the idealized flow patterns of the extrudate. Furthermore, dies manufactured by the instant method can have land areas which take into account shrinkage of the extrudate and which can have adequate temperature controls with minimal thermal lag to allow maintenance of the extrudate at the desired temperature.

In a preferred embodiment, this invention contemplates placing a membrane of flexible material, having its upper and lower ends open, around a first and a second solid member. The first solid member has an outer peripheral contour which is circular or otherwise substantially similar to the inner peripheral contour of the exit port of an extrusion apparatus. One open lateral end of the tubular membrane is placed in intimate contact with the entire outer peripheral contour of the first solid member. The second solid member has an outer peripheral contour substantially similar to the profile of the product to be extruded. The second lateral end of the membrane is placed such that it is in intimate contact with the entire outer peripheral contour of the second solid member.

A material having hardening properties, such as plaster is introduced into the inner portion of the tubular membrane and permitted to harden. This provides a "positive" of the contour formed by the tubular membrane of flexible material. Once the material has hardened, the membrane is stripped away.

The outer contour of the hardened material is coated with a material having a high strength, such as steel. The coating is hereafter referred to as a liner. This steel liner forms the entrance region, transition region and land area of the final die. After the steel has cooled, the hardened material is washed away leaving a negative of the idealized flow patterns of the material to be extruded. The liner is then encapsulated into the final die by casting techniques. Thermocouples and heating elements can be distributed around the liner and leads can be drawn from these elements to the outside.

One object of this invention is to provide an extrusion die having a transition region and land area substantially similar to idealized flow patterns of the material to be extruded.

It is a further object of this invention to provide a gradual transition region from the exit port of an extrusion apparatus to the exit port of the extrusion die which approximates idealized flow patterns of the material to be extruded and where the profile of the finally extruded product is an arbitrary complicated shape.

3

It is another object of this invention to provide a method for manufacturing the transition region and land region of an extrusion die which is simpler and more economical than prior techniques and which allows the manufacture of relatively uniform dies.

It is a still further object of this invention to provide an apparatus for manufacturing the transition region and land region of an extrusion die where the profile of the finally extruded product is a complicated design.

It is a still further object of this invention to provide a land area in a die which can take into account the memory of the extrudate.

It is a still further object of this invention to provide a die employing the transition region and land region manufactured according to one aspect of the invention and to provide adequate temperature controls in the die to allow a constant flow of extrudate through the die.

These and further objects of this invention will appear in the description as illustrated by the accompanying drawings and pointed out in the claims.

BRIEF DESCRIPTION OF THE DRAWINGS

Referring now to the drawings in which:

FIG. 1 is a longitudinal cross sectional view of an extrusion apparatus employing a die manufactured according to this invention.

FIG. 10 is a vertical cross sectional representation of one die for extruding an L-shaped profile.

DETAILED DESCRIPTION OF ONE PREFERRED EMBODIMENT OF THE INVENTION

Figure 2:
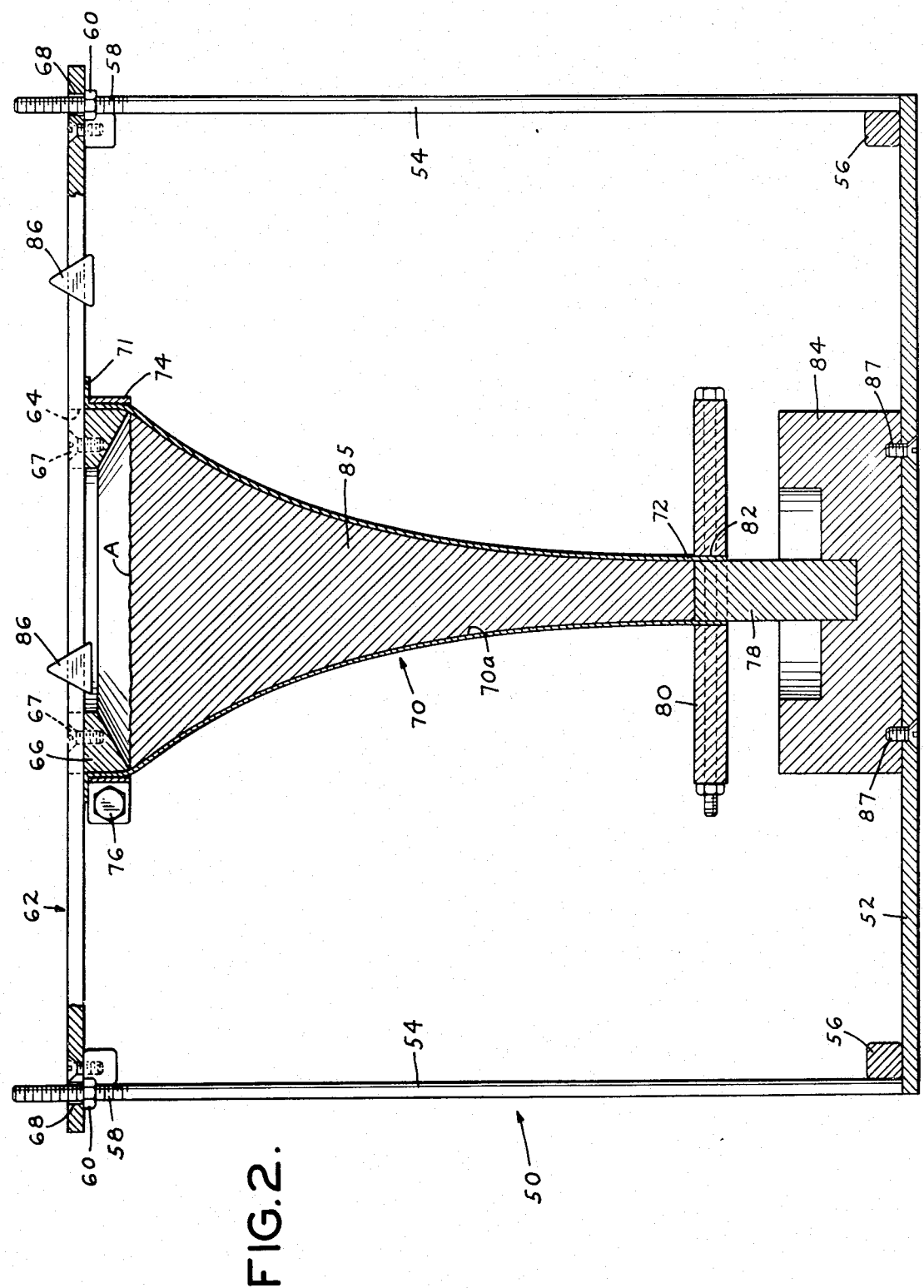
FIG. 2 is a vertical cross sectional view of one embodiment of an apparatus for manufacturing the die.

The process of extrusion basically consists of converting a suitable raw material into a product having a specified cross section and an outer peripheral contour, called a profile, by forcing the raw material through an orifice or profile die under controlled conditions. Generally, the equipment employed must be capable of providing substantially uniform and continuous pressure on the material and, in certain cases, should have means for softening or otherwise conditioning the raw material to be extruded. The general idea is to condition the raw material to permit it to flow through the die such that as it exits from the die it will be sufficiently solidified to retain the desired configuration or profile. There are a number of extrusion apparatus available. A die manufactured according to the instant invention is capable of performing satisfactorily with present extrusion apparatus.

FIG. 1 shows, by way of illustration, a screw extrusion machine 2 employing a profile die 40 according to the instant invention at its exit orifice. The extruder 2 generally comprises a base 4 of heavy steel or other material to maintain the extruder 2 in place. A drive motor 6 is rigidly affixed to base 4 and is capable of operating the extrusion mechanism. Motor 6 is affixed to U-drive unit 8 by means of shaft 10. Gear drive unit 8 provides an appropriate choice of torque depending on the physical properties of the extrudate. Gear drive unit 8 is affixed by means of shaft 12 to double reduction gears 14. These double reduction gears 14 provide rotational motion to power the screw portion of the extruder 2. The double reduction gears 14 are affixed by means of shaft 16 to thrust bearing 18. Thrust bearing 18 is provided to allow better alignment of the central shaft 20 and greater rigidity at one lateral extremity of the shaft. Shaft 20 is affixed to cylinder 22, the cylinder 22 having a screw 24 disposed along its entire length. A hopper 26 extends into a throat 28. The throat 28 opens into a barrel 30 at the junction of shaft 20 and cylinder 22. The screw 24 and cylinder 22 are placed within barrel 30. The inner diameter of barrel 30 is substantially equal to the outer dimensions of screw 24. A plurality of heating elements 32 are disposed along substantially the entire length of the barrel 30 to provide a regulated source of heat to the barrel. Venting apparatus 34 is provided to eliminate excess moisture and condensation from barrel 30. A breaker plate 44 is affixed to the exit orifice 42 of the extrusion apparatus 2. A profile die generally labeled 40 is also affixed to the exit orifice 42 of the extrusion apparatus downstream of breaker plate 44. The profile die 40 in generally coaxial with exit orifice 42. The profile die 40 comprises a transition region 46 and a land region 48.

One embodiment of an apparatus for manufacturing the die 40 is shown in FIG. 2. The apparatus includes a frame generally labeled 50 having a base 52 and a plurality of uprights 54 rigidly affixed to base 52 by means of corner supports 56. In the illustrated embodiment of the invention the upper extremities of the uprights 54 have threads 58 capable of mating with the inner threads of support nuts 60.

A plate 62 extends between the uprights 54 adjacent their upper ends. The plate 62 is provided with a central cut-out 64 and a plurality of peripheral apertures 68 adjacent the corners of the plate. The plate 62 is situated such that the peripheral apertures 68 are slidably positioned on uprights 54. Cut-out 64 can have any desired configuration. In the preferred embodiment, cut-out 64 has a circular configuration. A ring shaped member 66 is affixed to plate 62 by means of screws 67. Annular member 66 has an inner configuration substantially similar to the peripheral configuration of cut-out 64. The outer peripheral contour of annular member 66 is substantially similar to the inner peripheral contour of exit orifice 43 of the extrusion apparatus on which the die is to be used.

A tubular membrane 70 of flexible material having an upper 71 and lower 72 open end is disposed beneath the plate 62 with the upper end 71 of the membrane in intimate contact with the external peripheral contour of annular member 66. A clamp 74 having an inner configuration complementary to the outer peripheral contour of the annular member 66 is positioned around the annular member 66 such that the cylindrical membrane 70 is caught between annular member 66 and clamp 74. Clamp 74 has a tightening screw 76 to hold cylindrical membrane 70 in intimate contact with the outer peripheral contour of annual member 66 and prevent cylindrical membrane 70 from slipping off of annular member 66.

The lower open end 72 of the cylindrical membrane 70 is placed around a land mass generally labeled 78. The land mass 78 has a profile substantially similar to that of the finally extruded product. The land means 78 can be cut from solid material. Profile clamp 80 having an inner peripheral contour 82 whose profile is the complement of the land mass 78 is placed around the land mass 78 such that cylindrical membrane 70 is intermediate land mass 78 and profile clamp 80. By tightening profile clamp 80, cylindrical membrane 70 is held in substantially intimate contact with all faces of the land mass 78.

The land mass 78 is embedded in or otherwise rigidly secured to a land terminator 84. Land terminator 84 is rigidly affixed to base 52 by means of screws 87. Pressure fittings 86 are affixed to plate 62. A pressure can be exerted on pressure fitting 86 in a direction perpendicular to plate 62 and base 52 so as to displace the plate 62 from the base 52. This will elongate the cylindrical membrane 70 to the configuration shown in FIG. 2. When the desired elongation of the membrane 70 is obtained, support nuts 60 can be positioned on the threaded upper portion 58 of uprights 54 to provide the necessary restraining force on upper plate 62 against the downward force being exerted by cylindrical membrane 70.

After the upper plate 62 and the base 52 have been separated from one another to stretch the membrane 70 to the desired die contour, a coating is formed by pouring a material 85 having hardening properties into the vessel created by the stretched membrane 70. The material 85 having hardening properties is poured through cut-out 64. The material 85 which is poured into the vessel should be one having hardening properties so as to assume the configuration of the inner surface of the membrane. In one preferred embodiment plaster was used to fill the vessel formed by the elongated cylindrical membrane 70. It is desirable to use a material 85 having hardening properties which can be dissolved or rendered soluble by the action of water or heat, as will be discussed hereinafter in more detail.

After placing the frame 50 along with the distended membrane 70 into a tank (not shown) a material, preferably a liquid, having a specific gravity similar to the specific gravity of the material 85 having hardening properties is placed into the tank. The level of the liquid is raised until it is just below the lower surface of plate 62. The material 85 having hardening properties is then placed into the vessel. Placing the frame 50 and elongated cylindrical membrane 70 into the tank filled with liquid minimizes the possibility of pressure distortion or distention of the elongated cylindrical membrane 70 due to the weight of the material 85 having hardening properties. Although FIG. 2 shows the vessel formed by elongated cylindrical membrane 70 as being completely filled up to line A with hardening material, this need not be the case. Depending on what material 85 having hardening properties is employed, anything from a solid positive of the contours of the inner wall 70a of elongated cylindrical membrane 70 to a shell-like positive of the contours of the inner wall 70a of elongated cylindrical membrane 70 will suffice. The particular material 85 having hardening properties will also depend on what material is to be placed over the positive which has been made of the elongated cylindrical membrane 70. By elongating the membrane 70, the resultant contour yields a transition region which at each incremental distance around its peripheral contour at a given axial position forms a substantially idealized flow pattern analog in both the axial direction for each incremental distance and around the peripheral contour for each incremental distance. Where the product to be extruded, and hence the die, has a complex outer peripheral configuration or profile, obtaining a continuum transition region can be achieved by these techniques.

Figure 3:
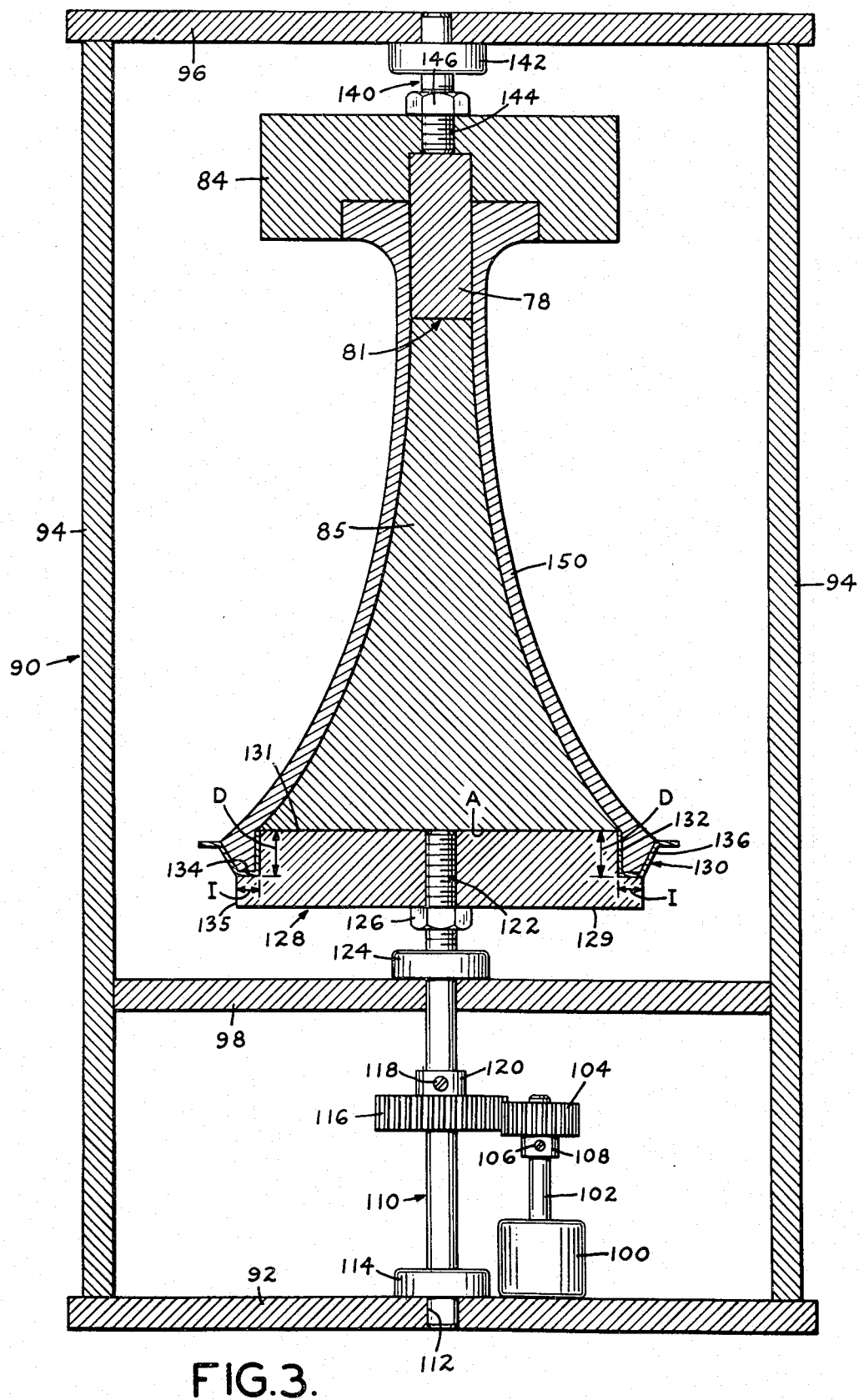
FIG. 3 is a vertical cross sectional view of the hardend material and the coating which is applied to the hardened material to form the liner and one embodiment of and apparatus for doing the same.

Referring now to FIG. 3, there is illustrated one preferred method and a preferred apparatus for constructing the liner for the die. Membrane 70 is stripped away from the positive 85 made of hardened material. Under normal conditions the land mass 78 of solid material remains fixed to the positive 85 of hardened material at junction 81. The land mass 78 and positive 85 of hardened material are placed in a frame. The frame, generally labeled 90, has a base 92, vertical frame members 94 perpendicular to base 92 and parallel to one another, and a frame top 96 parallel to base 92. A horizontal support member 98 is positioned parallel to base 92 and frame top 96 and intermediate base 92 and frame top 96. A motor 100 is rigidly affixed to base 92. Motor shaft 102 extends from said motor. Rotational coupling 104 is rigidly affixed to shaft 102 by means of tightening screws 106 extending through collar 108.

A shaft 110 is rotatably mounted in hole 112 of base 92. A restraining collar 114 is situated on shaft 110, in close juxtaposition to the upper surface of base 92. A rotational coupling 116 is rigidly affixed to shaft 110 by means of screw 118 and collar 120. Rotational coupling 116 meshes with rotational coupling 104 affixed to shaft 102 to impart rotational motion to shaft 110 upon rotation of shaft 102 by motor 100. Shaft 110 extends through horizontal support member 98. The upper portion of shaft 110 has threads 122. A rotational restraining collar 124 is provided on shaft 110, in close juxtaposition to the upper surface of horizontal support member 98. Support nut 126 having threads complementary to threads 122 is inserted on the upper portion of shaft 110. A plate 128 is rigidly affixed to the upper portion of shaft 110 and support nut 126 is tightened until it contacts the lower surface 129 of plate 128.

The plate 128 has upper 131 and lower 129 circular surfaces. The lower surface 129 has a surface area which is greater than the surface area of the exit port 43 of the extrusion apparatus and consequently of the input port of 160 of the die. The upper surface 131 has a surface configuration and surface area substantially similar to the exit port 43 of the extrusion apparatus. The positive created by material 85 having hardening properties is rigidly affixed to plate 128 such that the center line of the material 85 having hardening properties is coincident with the logitudinal axis of shaft 110. Plate 128 has a peripheral groove 133 indented a distance l from the outermost edge 135 of plate 128 and a depth D from the upper surface 131 of plate 128, such that the upper surface 131 of plate 128 which forms an interface with the material 85 having hardening properties will have a surface configuration substantially similar to the surface configuration of the material 85 having hardening properties at the interface. An annular member 130 having a vertical support member 132 of height D and a horizontal support member 134 of length l is placed around the indented portion of plate 128. Retaining surface 136 of the annular member 130 forms a cup-like receptacle with walls 132 and 134. The particular configuration of ring member 130 is dependent on the final desired configuration of the liner, as will be discussed hereinafter.

Land terminator 84 is rigidly affixed to shaft 140. Shaft 140 is rotatably mounted in frame top 96. The longitudinal axis of shaft 140 in coincident with the longitudinal axis of the material 85 having hardening properties and consequently coaxial with the longitudinal axis of shaft 110. Shaft 140 is rotatably affixed to top 96 by means of retaining collar 142. Shaft 140 is threaded 144 at its lower extremity. A retaining nut 146 is provided to rigidly affix land terminator 84 to shaft 140. By activating motor 100, the material 85 having hardening properties is correspondingly rotated about its longitudinal axis. Material 85 having hardening properties is coated with a layer of liner material 150. The thickness of this liner material is variable, depending on the use to which the die is to be put.

A liner will be under considerable stress from the material to be extruded and may be designed either to be self-supporting or to require mechanical support by a shell. For self-supporting liners, that is, liners which do not employ a shell to increase the tensile strength of the liner, the minimum thickness will be determined by the yield strength of the liner material and by the maximum stresses to be encountered inside of the liner. By considering the liner as a thick walled cylinder with closed ends, and subjected to an internal pressure P, a close approximation of probable yield strength and internal liner pressures can be obtained.

The internal pressure at which yielding will take place in a cylinder with zero axial strain is given by:

$$P = \frac{2}{\sqrt{3}} \sigma_o \ln \frac{b}{a} \qquad \text{Eq. 1}$$

Where:
P = internal pressure
b = external radius of the cylinder
a = internal radius of the cylinder
$\sigma_o$ = yield stress, in simple tension, of the cylinder wall material.

For a weak liner material with a yield strength of 30,000 pounds per square inch, Eq. 1 provides the information found in Table 1, for the internal pressures of 1,000, 2,500 and 5,000 pounds per square inch and internal diameters of 1 inch, 2 inches and 3 inches.

TABLE 1.

| Internal Radius in inches | Minimum Wall Thickness Internal Pressure in psi | | |
|---|---|---|---|
| | 1,000 | 2,500 | 5,000 |
| 1.0 | .014 | .037 | .077 |
| 2.0 | .030 | .075 | .155 |
| 3.0 | .045 | .11 | .23 |

The minimum wall thickness ranges up to 0.23 inch for the combination of 5,000 pounds per square inch internal pressure at a diameter of 3 inches. This is well within the range of a number of materials, for example, steel, etc., and pressures to be encountered within the die.

The liner wall thickness may be chosen to be a variable as a function of the internal radius of the die along the axial direction of the liner. For example, the liner may be chosen to be thickest near the input port and thinnest in the land region, because the maximum stress in the liner varies inversely with the diameter and the position along the axis.

The above calculations are based upon a fully self-supporting liner. However, it is clear that where a casting material is employed, some support will be given the liner by the casting material. In general, the modulus of the material employed in the casting will usually be lower than that of the liner material and therefore will provide support only in proportion to the ratio of the two moduli. In order to increase the mechanical support of the liner by the die body and particularly the casting material, the entire structure may be prestressed to the operational temperature in a compressional mold during the manufacturing process.

In one preferred embodiment the liner 150 is manufactured by metallizing the material 85 having hardening properties. Metallizing or flame spraying, as it is commonly termed, is accomplished by rotating the material 85 having hardening properties, and spraying molten metal onto the surface to form a coating. Pure or alloy metal is melted in a flame and atomized by a blast of compressed air into a fine spray. This spray builds up on material 85 having hardening properties to form a solid metal coating. Because the molten metal is accompanied by a strong blast of air, the material 85 having hardening properties does not heat up appreciably. For a further discussion of flame spraying, reference is made to H. S. Ingham and A. O. Sheppard, Flame Spray Handbook, published by Metco Inc., Westbury, Long Island, New York. Other techniques such as investment casting techniques, powder metallurgy techniques, or other suitable coating methods may be employed in the fabrication of the liner 150.

Figure 4:
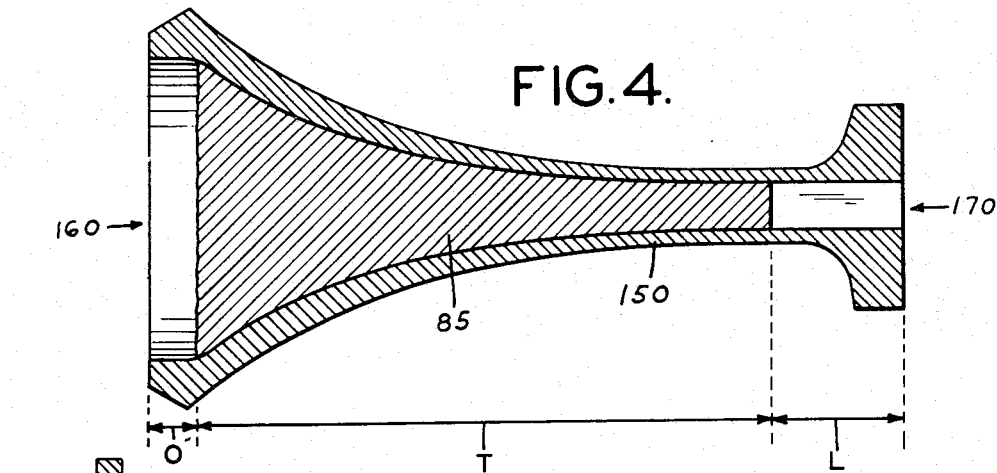
FIG. 4 is a vertical cross sectional view of a liner and the hardened material within the liner.

Referring now to FIG. 4, there is shown the finished liner 150 in which the land mass 78 has been removed and plate 128 and associated ring 130 have been removed from the input port 160 of the liner. The material 85 having hardening properties is still situated within the liner. However, by appropriate choice of material 85, the material may be removed by merely applying water, in the case of plaster, or heat depending upon the nature of the material. Because liner 150 is composed of a material much harder than material 85 having hardening properties, there will be little or no possibility of injuring the liner 150. The liner 150 is composed of essentially three regions. Region O in the vicinity of input port 160 has an inner peripheral configuration substantially similar to the exit port 43 of the extrusion apparatus on which the die is to be used. The external configuration of region O is dependent on the design requirements of the die and the configuration of the face plate 180 of the die shell 200, as will be hereinbelow discussed.

The next region is region T or the transition region. This region lies intermediate the input port 160 and the exit port 170 of the liner 150. This region has a substantially exponential contour for each incremental distance in the axial direction of the liner and along each incremental distance around the peripheral contour of the liner at any given axial position on the liner. The final region L is the land region. The land region has an inner configuration substantially similar to the profile of the finally extruded product. However, as will be discussed in the ensuing description of further embodiments of the instant invention, the land region L can be modified to account for the elastic memory of the material to be extruded. The outer contour of land region L is a design variable depending on the configuration of the shell 200 to be used in manufacturing the final die.

Figure 5:
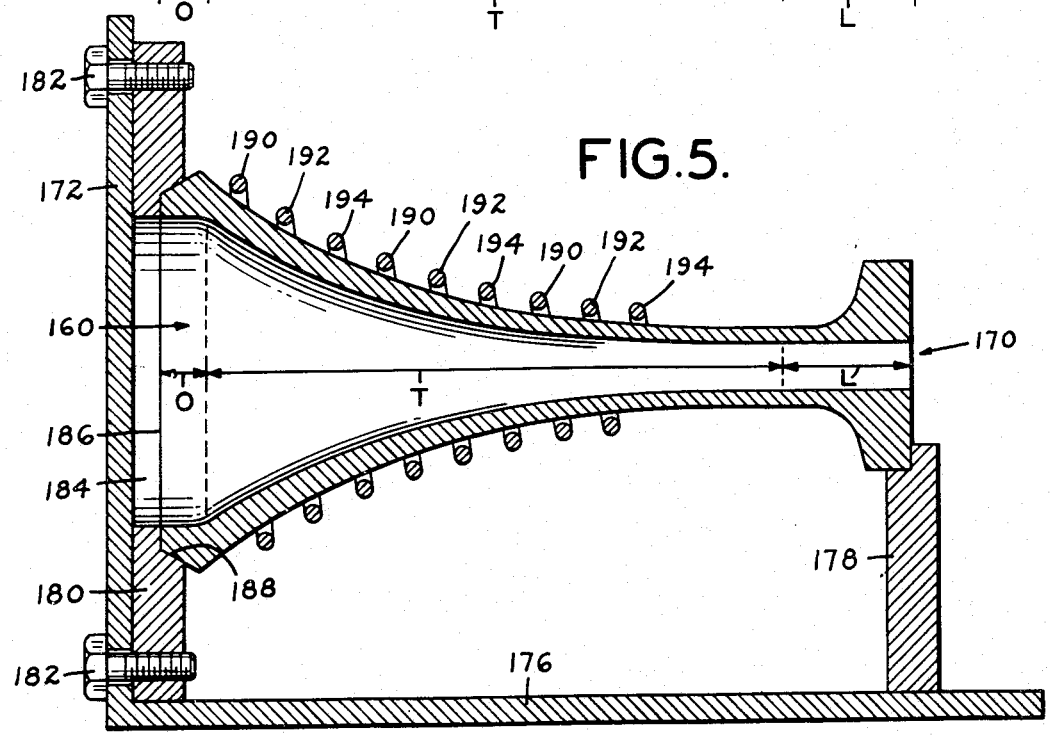
FIG. 5 is a vertical cross sectional view of a liner partially placed in the shell of an extrusion die.

Referring now to FIG. 5, there is shown a cross sectional representation of a partly assembled die comprising a frame support member 172 having a vertical frame plane 174 and a horizontal frame plane 176 perpendicular to one another, and affixed to one another at their respective edges. A support member 178 is mounted on horizontal frame plane 176, perpendicular to frame plane 176 and parallel to vertical frame plane 174. A face plate 180 is rigidly affixed to vertical frame plane 174 by means of threaded screws 182. Plate 180 has a central aperture 184 having a peripheral configuration substantially similar to the peripheral configuration of input orifice 160 of liner 150. The face plate 180 is situated such that the peripheral configuration of central aperture 184 aligns with input port 160 at their interface 186. Central aperture 184 has a circumferential enlargement 188 which is complementary to the outer peripheral configuration of orifice region O.

A number of heater elements 190, cooler elements 192 and sensors 194 are disposed around liner 150. In a preferred embodiment the heater 190, cooler 192 and sensor 194 elements substantially conform to the outer contour of the liner 150 in the vicinity of the respective element and all points on the respective element are substantially equidistant from the corresponding point on the liner 150, thereby allowing uniform heating, cooling or sensing by the respective elements. A number of elements can be placed around the liner 150 in a predetermined configuration Furthermore, all three elements need not be simultaneously employed. Although FIG. 5 demonstrates one possible configuration having all three types of elements, the use of other elements to modify the material to be extruded is within the scope and spirit of this invention. In the remaining figures, only heating 190 and sensing 194 elements will be described.

Figure 6:
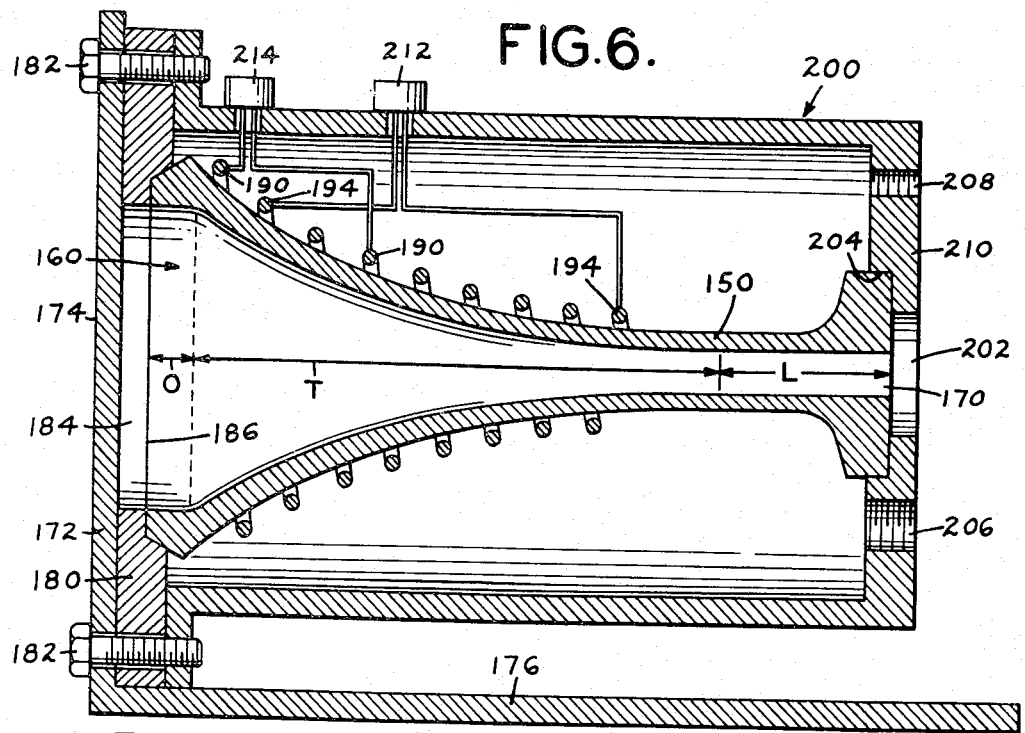
FIG. 6 is a vertical cross sectional view of a liner in a shell of an extrusion die with thermocouple and heating elements disposed about the liner.

Referring now to FIG. 6, there is shown a cross sectional representation of an extrusion die according to one embodiment of the invention in which the liner 150 has been encased in a shell, generally labeled 200. The shell is preferably made of steel or some other high strength material. Shell 200 substantially encases liner 150. Shell 200 has an output port 202 appreciably larger than output port 170 of the liner, and which is coaxial with the output port 170 of the liner. Shell 200 is in intimate contact with liner 150 at the output port 170 of liner 150 to provide support to the output port 170 of the liner 150.

In a preferred embodiment the central aperture 202 of shell 200 has a ridge 204 along the inner surface of front face member 210 in which aperture 202 is formed. This ridge 204 is substantially identical in shape to the outer peripheral contours of the exit portion 170 of the land region L of liner 150. A filling port 206 and a venting port 208 are provided in the front face member 210 of the shell. A sensing unit 212 and a heating unit 214 are affixed to one of the sides of the shell. The leads from the heating unit 214 and sensing unit 212 are connected to the heating 190 and sensing 194 elements. The shell is rigidly affixed to plate 180 and plate 172, by means of bolts 182.

The die body, comprised of plate 180, shell 200, and material 200 (See FIG. 7), plays several roles and the characteristics of the die body should be consistent with its various functions. The die body supports the liner 150, supports the auxiliary devices, such as the sensors 212 and heating units 214, and provides thermal insulation between the liner 150 and the shell 200 of the die. Furthermore, it is preferable that the material 220 employed to fill the interstice between the liner and the shell be castable material. Other properties of the material 220 should be determined on an individual basis with regard to the operating conditions, such as the temperature at which the die is to be run, and the pressure at which the material is to be extruded. While, as has been mentioned above, the liner may be of the self-supporting type, an additional safety factor is achieved if the liner is encased in a material to provide external compressional support.

Furthermore, such external support of the liner may allow economies in the liner manufacture, because a certain amount of compressional force can be transferred to the casting material thereby permitting a thinner liner.

Assuming that the shell has a radius $R_o$ and that the liner has a radius $R_1$ and that both the liner and the shell are made of steel, and further assuming that concrete cures in 24 hours and shrinks by a factor $\beta, \beta$ being the volume shrinkage in parts per million, we find that the inner radius $R_1$ of the concrete cast between the steel shell 200 and the steel liner 150 at any given point on the axis remains at R assuming that the "creep" of the concrete reduces the stress factor to 0.

Assuming that the boundary constraints at $R_1$ yield no perturbation in volume shrinkage then:

$$(1-\beta) \pi (R_o^2 - R_1^2)L_o = \pi (R_{of}^2 - R_{1f}^2)l_1$$

Eq. 2 where
$R_{of}$ = outer radius of the concrete after shrinkage
$R_{1f}$ = inner radius of the concrete after shrinkage
$R_{1f} = R_1$
Because $R_{1f} = R_1$ according to the assumption that the constraint gives rise to no perturbation in the volume shrinkage, we have:

$$R_{of}^2 = R_o^2 - \beta (R_o^2 - R_1^2),$$

Eq. 3

Taking for example:

$$\beta = 500 \times 10^{-6}$$
$$R_1 = 1.5$$
$$R_o = 2.5$$

we see that $R_{of} = 2.4996$. Therefore the deviation from R is equal to $0.4 \times 10^{-3}$.

Assume a uniform rise in temperature of the entire structure to 300°, the co-efficients of linear expansion are approximately:

$$\alpha \text{ steel} = 10 \times 10^{-6} \text{ inch/°C},$$
$$\alpha \text{ concrete} = 15 \times 10^{-6} \text{ inch/°C}$$

Therefore:

$$\Delta \alpha = \alpha \text{ concrete} - \alpha \text{ steel} = 5 \times 10^{-6} \text{ inch/°C}.$$

Eq. 4

Given that the original separation at the outer radius is:

$$\Delta R_o = 0.4 \times 10^{-3} \text{ in.}$$

the temperature rise to close this separation is:

$$\Delta T_c = \frac{\Delta R_o}{\Delta \alpha}$$

$$= \frac{0.4 \times 10^{-3}}{5 \times 10^{-6}}$$

$$= 80°C.$$

Eq. 5 for a 300° temperature change we find that the constraint function attributable to the temperature rise is equal to $\Delta T = 300° - 80° = 220°C$. The outer shell constrains the concrete in the radial direction according to the equation:

$$\Delta R_{ot} = R_o \Delta \alpha \Delta T$$

$$= (2.5)(5 \times 10^{-6})(220)$$

$$= 2.75 \times 10^{-3} \text{ inches.}$$

Eq. 6

The inner radius has a zero initial separation but the differential thermal expansion results in separation:

$$\Delta R_{it} = R_i \Delta \alpha \Delta T$$

$$= (1.5)(5 \times 10^{-6})(300)$$

$$= 2.25 \times 10^{-3}$$

Eq. 7

Therefore: $\Delta R_{ot} - \Delta R_{it} = (2.75 - 2.25) \times 10^{-3}$ $$= 0.5 \times 10^{-3}$$

Assuming that there are no other influences or stresses, the concrete will be forced against both the inner and outer walls with a compressional load:

$$\sigma = \psi \epsilon$$

Eq. 8

Where $$\epsilon = \frac{\Delta R_{ot} - R_{it}}{R_o - R_i}$$
$$= \frac{0.5 \times 10^{-3}}{2.5 - 1.5}$$
$$\phantom{=} 0.5 \times 10^{-3}$$

Assume:

$\psi = 3 \times 10^6 \text{ psi } \sigma = (3 \times 10^6)(0.5 \times 10^{-3}) = 1500 \text{ psi.}$ Although the calcuations would indicate that the compressional load on the inner liner and the outer shell are equal, this is not entirely the case in all situations. As a practical matter, the stress at $R_o$ will probably be slightly greater than this value and the stress at $R_i$ will be probably be slightly less than this value.

Figure 7:
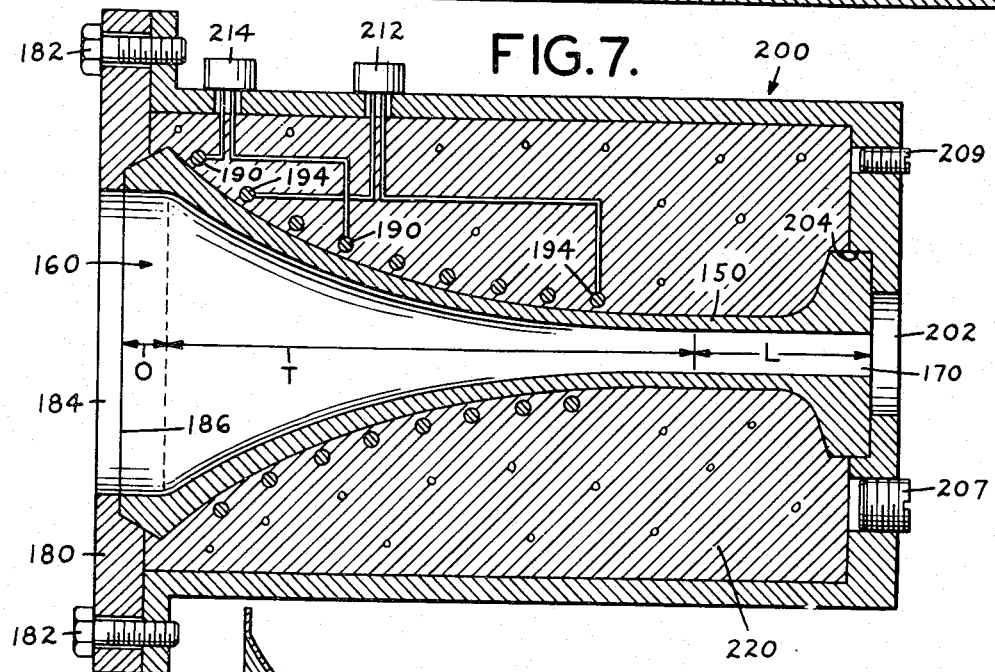
FIG. 7 is a vertical cross sectional view of a final die configuration with a liner body in place.

Referring now to FIG. 7 there is shown one embodiment of the die manufactured by means of the instant invention. A material 220 is situated intermediate the liner 150 and the shell 200. The material fills substantially the entire liner-shell interspace. Material 220 is an appropriate casting material such as concrete, or steel, depending on the use to which the die is to be put. The casting material 220 is introduced through input port 206. The air which is present in the interspace is vented by means of venting aperture 208. In a preferred embodiment to facilitate completely filling the body volume, and to reduce voids, the concrete may be introduced under pressure or vacuum and with vibration. The entry port 206 and the venting port 208 are closed by means of threaded lugs 207 and 209, respectively. When the material has cured, the die is ready for use upon removal of member 172. The bolts 182 which hold plate 180 to the die can be reversed to affix the finished die to the extrusion apparatus.

Figure 8:
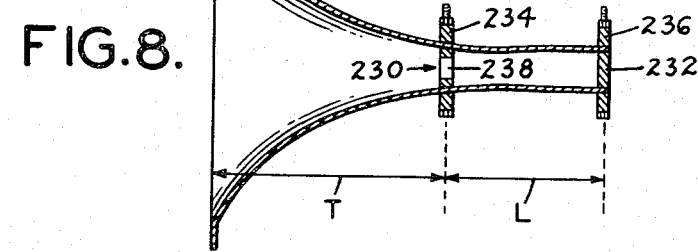
FIG. 8 is a vertical cross sectional view of a apparatus embodying the instant invention, or manufacturing a liner having a land region for compensating for elastic memory.

Referring now to FIG. 8, there is shown another embodiment of the instant invention in which the land area L has been modified to account for the elastic memory of the material to be extruded.

It is a function of the extrusion die to convert a material from its molten state to a desired profile shape. Because the material should be viscoelastic rather than liquid, it has a time dependent memory of its previous dimensions and shape as it is being reformed. This is particularly true in the case of plastics. Thus, if during the process of reshaping, the material should be released from the constraints imposed by the liner of the extrusion die, it will tend to revert partially towards its prior configuration. If the shape change desired over the land region of the extrusion die is minimal and if the land region L can be relatively long, the emerging extruded profile will tend to show few memory-induced changes.

However, there are applications in which the shape changes must be large over a short interval of time and distance and particularly where the land region L might be shorter than would otherwise be desirable. A reduced residual-memory land region can be achieved in another embodiment of the instant invention. Rather than employing a solid land mass 78 in the stretching frame 50, a profile ring 230 and a profile plate 232 may be substituted. The profile ring 230 is situated at the interface between the transition region T and the land region L. The profile plate 232 is situated at the lateral extremity of membrane 70, corresponding to the output port of the liner 150. Profile clamps 234 and 236 hold membrane 70 in intimate contact with profile ring 230 and profile plate 232, respectively.

The transition region T is formed in the same way as through a solid land mass 78 were being used. Once the membrane 70 between the entrance port and the profile ring 230 has been stretched, a forge is exerted on profile plate 232 so as to stretch the membrane intermediate profile ring 230 and profile plate 232. During this stretching process, profile plate 232 should be maintained parallel to profile ring 230 in much the same way as the transition region portion of membrane 70 was stretched.

As a result of this stretching the membrane intermediate profile ring 230 and profile plate 232 will tend to achieve a configuration of minimum stress. Thus, the membrane 70 will tend to come together at the midpoint between the profile ring 230 and the profile plate 232. Profile ring 230 has a filling aperture 238 perpendicular to the plane of the profile ring 230. When material 85 having hardening properties is poured into the transition region T, the land region L will also be filled. After the material has hardened and the membrane has been stripped away, the resultant land region L is cut at a point intermediate profile ring 230 and profile plate 232, nearer profile plate 232 than profile 230, such that rather than being a decreasing or narrowing function, the exit port 170 can be an expanding function. In this way the elastic memory of the material to be extruded will be such that it will tend to counterbalance the tendency of the material to expand when it exits from the die. The liner 150 configuration prior to exiting from the exit port 170 of the liner 150 will be an expanding function and therefore the memory-induced alteration will tend to cause the extrudable material to increase less than otherwise Referring now to FIG. 9, there is shown an exponential contour for an extrusion die liner. The inner configuration along the axial direction in a liner 150 is substantially similar to the exponential contour shown in FIG. 9. This contour is expressed in the analytical form:

$$R = aR_o c^{-x}$$

Eq 9

Where $R$ = radius at a distance X from the input port 160

$n$ = arbitrary constant.

Figure 9:
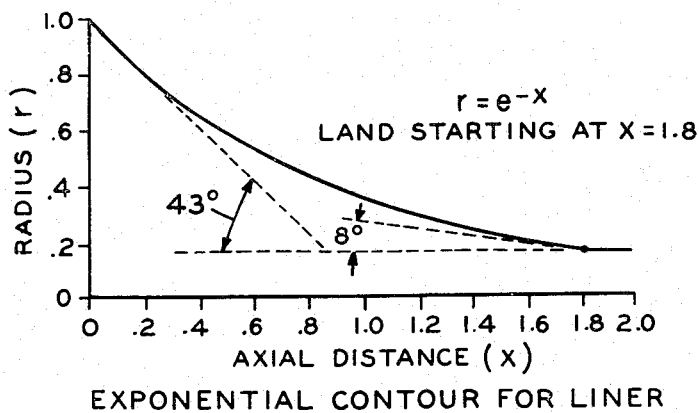
FIG. 9 is a graphic representation of the radial variation of the liner as a function of axial position.

Assuming that $a$ and $R_o$ are equal to unity, FIG. 9 is a graphical representation of the relationship.

In such a liner contour the emergent residual memory is minimized because there is a constant fractional area reduction per unit axial increment along the longitudinal axis of the liner. Furthermore, the proportional area reduction over the transverse cross section of the liner is evenly distributed from the input port 160 to the land region L. Therefore, only small dimensional adjustments need take place close to the land region L. This further minimizes emergent residual memory. Where the profile of the extruded product is other than a highly simplistic shape such as circular, the variation in cross sectional shape from the circular exit port 43 of the extrusion apparatus to the particular profile desired must be gradual, preferably as an exponential around the entire peripheral contour of the cross section. This can be better seen by referring to FIG. 19 which is a cross sectional view of one particular die configuration having a circular entrance port 160 and an L shape exit port 170.

Figure 11:
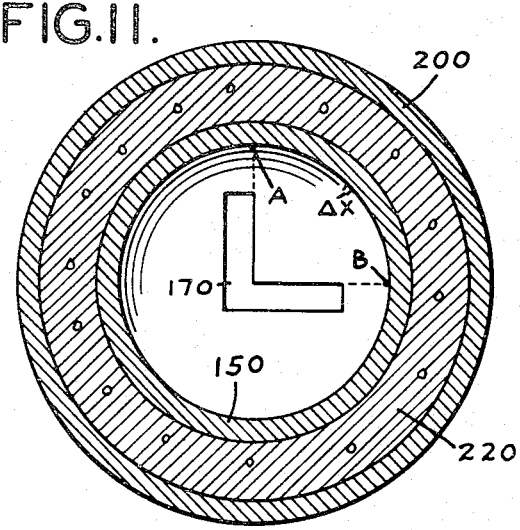
FIGS. 11 through 16 are cross sectional views taken along the lines 11—11, 12—12, 13—13, 14—14, 15—15, and 16—16 of FIG. 10 showing the transition from a circular port to an L-shaped port according to one embodiment of the instant invention.
Figure 12:
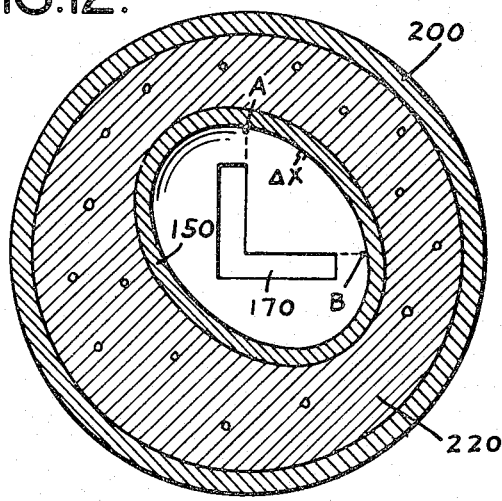
Figure 13:
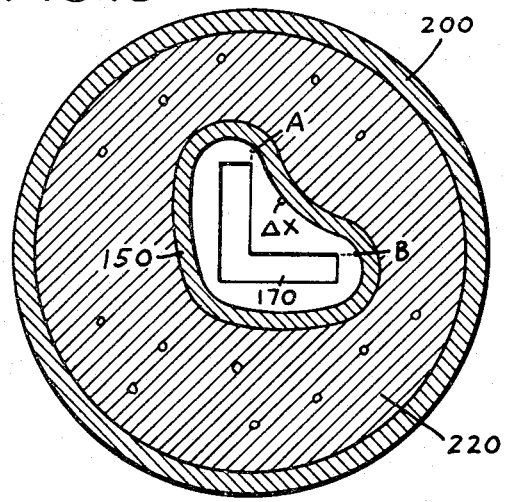
Figure 14:
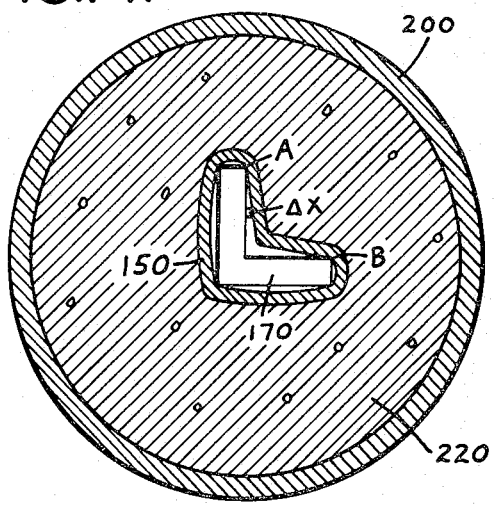
Figure 15:
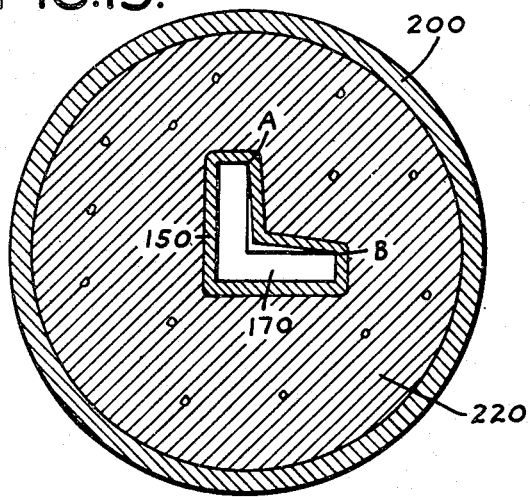
Figure 16:
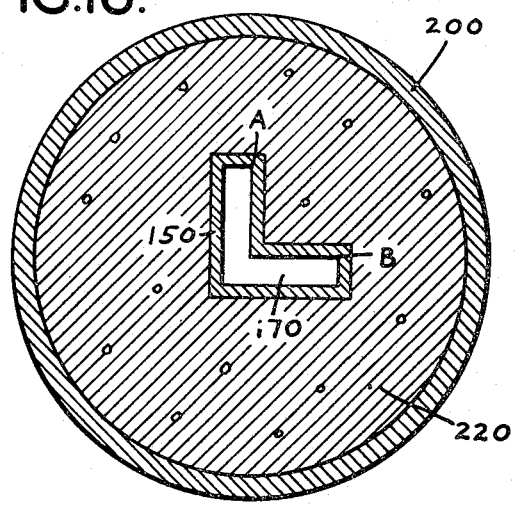

Referring now to FIGS. 11 through 16, there are shown cross sections taken through FIG. 10 which deplet the gradual shape change of the liner 150 from a circle in FIG. 11 to an L configuration in FIG. 16. In FIG. 12, the liner is generally oval, while FIG. 13 shows further deformation of the liner to a kidney shaped configuration.

In FIG. 14 the inner liner is starting to assume the L configuration of the desired profile.

FIG. 15 is taken in the vicinity of the land area and shows the liner contour just prior to the land area.

FIG. 16 shows the liner configuration at exit port 170.

Taking for example, two points A and B, at zero and 90°, respectively, and following corresponding points through FIGS. 12 through 16, an exponential function should be maintained through all points A while simultaneously maintaining an exponential function through all points B. As will be seen from these figures, although points A and B are taken by way of illustration, such an exponential function is mentioned through substantially every point in the axial direction for each incremental distance ΔX around the inner periphery of the die.

The mechanical behavoir of the elastomeric film of membranes may be considered as an analog solution of the geometric surface transformation by providing a gradual change in both shape and cross sectional area as a function of axial position. It is a property of elastomers that they do not exhibit discontinuities or abrupt shape changes in response to applied stresses. Therefore, the resultant geometry will show a smooth transformation to stresses applied to the elastomer. This shape results from the balance of stresses which are characteristic of the elastomer membranes.

A block of material having a profile substantially similar to the profile of the finally extruded product is clamped to a projection of a vertical milling machine. The vertical milling machine is one particular apparatus for converting a profile specification into a male land mass. The vertical milling table provided the x–y motion necessary for cutting the pattern. The x–y motion can be imparted manually; however, in the preferred mode of operation, the machinery is programmed for x–y motion with computer generated tapes. The land mass is placed in the membrane stretching frame. One of the lateral ends of the land mass in the plane of the profile is affixed to the land terminator by inserting the end of the land mass into a corresponding female land profile which has been cut in the land terminator. The termination is then clamped to the base of the stretching frame. The vertically movable upper plate of the stretching frame carries a ring affixed to its underside. The external diameter of the ring corresponds to the input port diameter of the finished die. An elastomeric membrane is stretched over the land mass and is held in place by a profile clamp. The profile clamp is shaped substantially like a female land profile so as to intimately mate with all surfaces of the land profile.

The other end of the elastomeric membrane is affixed to the ring on the underside of the upper plate of the stretching frame. A clamp having an inner peripheral configuration similar to the outer peripheral configuration of the ring is placed around the ring such that the membrane is intermediate the ring and the clamp. The clamp is then tightened to hold the membrane in place. An axial tension is now placed on the membrane by upwardly adjusting the upper movable plate. The membrane is stretched until the desired length and contour is achieved. The contour is essentiallly a function of the material to be extruded. Once a material has been chosen its susceptibility to extrusion and elastic memory are known factors. A plaster slurry is poured into the vessel formed by the membrane. Depending on the nature of the membrane used, it may or may not be necessary to employ a compensating bath as has been previously discussed. When the plaster has set, the membrane is stripped from the plaster positive and the positive is removed from the stretching frame and suitably prepared for flame spraying. The combined liner contour and the land profile and land terminator combination are removed and placed in a flame spraying jig. Other methods for coating the contour and the land profile may be employed. However, flame spraying or metallizing provides a simple coating method, especially where the liner is to have a variable thickness along its axial dimension. The equivalent of the input port end of the die is placed in a jig or ring type assembly which provides the correct geometry for the outer contour of the liner edge. The land terminator has been appropriately cut out to provide for the outer contour of the land end of the mold.

With the contour resting vertically upon its input port end there is no load exerted on the land end except for that required to hold it in a centered position. The assembly is then driven at an appropriate rate for metal spraying as discussed above. The metal may be sprayed in an axial distribution pattern according to the tensile force which is to be exerted along the axial dimension of the liner. For example, where the liner has a large component of area transverse to the direction of flow of the material to be extruded, the tensile force will be greater and hence a thicker lining will be required at that point. In the vicinity of the land region of the liner there will be little compressional force exerted; therefore, the liner thickness can be decreased at this point. After the metal, for example stainless steel, has been sprayed on the contour of the land terminator, the plaster of Paris contour and the newly formed liner are removed as a unit from the spraying jig. The plaster contour can be wasted away with higher pressure water jets and the land mass and land terminator are either slipped out of the land region of the liner, or if necessary, are melted out because the melting point of the sprayed metal is appreciably greater than that of the land mass or land terminator.

The liner is now ready for assembly in a die. Heating and cooling elements as well as sensor elements can be placed around the liner with suitable provision for electrical insulation from the liner. Leads are provided to all of the elements of a sufficient length to project through the outer shell and attach to connectors. A shell having a circumferential portion parallel to the axial direction of the liner whose radus is everywhere greater than the largest radius of the liner and having a land face transverse to the axial direction of the liner is placed over the liner. The leads to the heaters, coolers and sensors are brought out to the external indicator units.

An aperture is provided on the land face of the shell to support the liner and to provide an exit port for the material to be extruded. The circumferential portion of the shell is affixed to an input port plate having an aperture substantially similar to the input port of the liner and the exit port of the extrusion apparatus. The input port plate is provided with a recess to support the liner. The liner is allowed to rest in the recess in both the input port plate and the land face. The particular configuration of recesses is by no means meant to be exclusive and equivalent indentations and support members are within the spirit of this invention.

With the assembled die in the vertical position an appropriate casting material is introduced through an input vent in the shell. One casting material which may be employed is concrete; another is steel. In general, a moldable refractory material should be employed which is capable of withstanding compressional force. The material need not have a high tensile strength. It is mainly intended as a support for the liner to absorb compressional force exerted on the liner by the material to be extruded, and to aid in insulating the liner from the shell.

It is desirable that the casting material have a coefficient of thermal expansion similar to the coefficient of thermal expansion of the liner. However, this need not always be the case. For example, the liner can be prestressed to the operating temperature in cases where the coefficient of thermal expansion of the casting material is low. Some of the variables which go to determine what type of casting material should be used have been previously discussed in the specification.

In one plaster positive which was manufactured having a circular input port and an L-shaped profile similar to the die shown in FIG. 10 and the cross sectional views of the die, FIGS. 11 through 16, it was observed that the fractional area variation as a function of axial position, when measured per 0.1 inch of axial increment from input port to output port, was a relative constant having a root-mean-square value of $0.74 \pm 0.02$ inch in the region in which 90% of the shape change takes place. The transition was smooth over the entire peripheral contour of the die as a function of the axial position, thereby yielding a relatively uniform cross sectional variation along the axial dimension of the die.

In all cases it is to be understood the above described arrangements, particularly in the materials used to make the die liner and the materials employed in casting the die liner and the general configuration of the die are merely illustrative of a particular embodiment of the many possible applications of the principle of the invention. Numerous and varied other arrangements in accordance with these principles may readily be devised by those skilled in the art without departing from the spirit and scope of the invention.

We claim:

1. Apparatus for manufacturing a liner for use as an internal contour for an extrusion die for extruding material from the exit port of an extrusion apparatus into a desired profile having a predetermined cross-sectional shape corresponding to an output orifice of the liner, the liner having an input orifice substantially similar to the exit port of the extrusion apparatus and its output orifice substantially similar to the cross-sectional shape of the desired profile and the input orifice having a different cross-sectional shape than the output orifice, comprising
   a first fastening means,
   a first member having a profile substantially similar to the input orifice of said liner,
   a second fastening means,
   a second member having a profile substantially similar to the desired profile,
   a tubular elastomeric membrane having a first end and a second end, said first end of said tubular elastomeric membrane being secured by said first fastening means against said first member, and said second end of said tubular elastomeric membrane being secured by said second fastening means against said second member, to form a tunnel passage between said first member and said second member, and
   a substantial portion of the membrane between said first end and said second end being free from contact with said fastening members.

2. Apparatus for manufacturing a liner for use as an internal contour for an extrusion die for extruding material from the exit port of an extrusion apparatus into a desired profile having a predetermined cross-sectional shape corresponding to an output orifice of the liner, the liner having an input orifice substantially similar to the exit port of the extrusion apparatus and its output orifice substantially similar to the cross-sectional shape of the desired profile and the input orifice having a different cross-sectional shape than the output orifice, comprising
- a frame,
- a first fastening means,
- a first member having a profile substantially similar to the input orifice of said liner secured to said frame,
- a second fastening means,
- a second member having a profile substantially similar to the desired profile secured to said frame, said first member and said second member being capable of movement relative to one another,
- a tubular elastomeric membrane having a first and a second end, said first end of said tubular elastomeric membrane being secured by said first fastening means in intimate contact with substantially the entire periphery of said first member and said second end of said elastomeric membrane being secured by said second fastening means in intimate contact with substantially the entire periphery of said second member, said elastomeric membrane forming a tunnel passage between said first member and said second member, and
- said frame including means for moving one member with respect to said other member to tension and tubular elastomeric membrane between the first member and the second member.

3. Apparatus for making the liner for use as the internal contour for an extrusion die according to claim 2 in which said frame includes
- a plurality of upright members disposed intermediate said first member and said second member and perpendicular to the planes established by each of said members, and
- a support member movably affixed to one end of each of said upright members and to one of said fastening members to increase the separation between said first member and said second member.

4. Apparatus for making a liner for use as an internal contour for an extrusion die for extruding material from an exit port of a source of extrudate into a desired profile of predetermined cross-sectional area corresponding to an output orifice of the liner, the liner having an input orifice substantially similar to the exit port of the extrusion apparatus and its output orifice substantially similar to the cross-sectional area of the desired profile and the input orifice having a different cross-sectional shape than the output orifice, comprising
- a first fastening means,
- a first fastening member including a portion having a profile substantially similar to the input orifice of the liner,
- a second fastening means,
- a second fastening member including a portion having a profile substantially similar to the desired profile,
- a tubular elastomeric membrane having first and second ends, said first end being secured by said first fastening means to said first fastening member, said second end being secured by said second fastening means to said second fastening member,
- means for causing said tubular elastomeric membrane to be tensioned for forming a tunnel passage between said first and second fastening members,
- a substantial portion of said tensioned membrane between said first and second ends being substantially free of contact with said fastening members and said tensioning means.

5. Apparatus for manufacturing an internal contour for an extrusion die for extruding material into a desired profile of a predetermined cross-sectional area corresponding to an output orifice of the liner, the liner having an input orifice substantially similar to the exit port of the extrusion apparatus and its output orifice substantially similar to the cross-sectional area of the desired profile and the input orifice having a different cross-sectional shape than the output orifice, comprising
- a first fastening member,
- a first fastening means,
- a second fastening member,
- a second fastening means,
- a tubular elastomeric membrane having a first and a second end, the first end of said tubular elastomeric membrane being secured by said first fastening means against said first fastening member and the second end of said tubular elastomeric membrane being secured by said second fastening means against said second fastening member to form a tunnel passage between said first fastening member and said second fastening member,
- means to place said membrane in a tensioned condition, and
- a substantial portion of said tensioned membrane between said first and second ends being substantially free of contact with the first and second fastening means and the tensioning means.

6. Apparatus according to claim 5 including
- a third fastening member having a predetermined peripheral shape, the third fastening member being positioned between the first and second fastening members, and a third fastening means securing the tensioned membrane against a third fastening member.

* * * * *